US006968706B2

(12) United States Patent
Kadle et al.

(10) Patent No.: US 6,968,706 B2
(45) Date of Patent: Nov. 29, 2005

(54) HVAC SYSTEM WITH REFRIGERANT VENTING

(76) Inventors: Prasad Shripad Kadle, 63 Sable Run, East Amherst, NY (US) 14051; James Allen Baker, 46 Exeter Rd., Williamsville, NY (US) 14221; William James Kumpf, 295 Continental Dr., Lockport, NY (US) 14094; Mahmoud Ghodbane, 6605 Mulligan Dr., Lockport, NY (US) 14094; Lawrence P. Scherer, 18 Carolina Ave., Lockport, NY (US) 14094

( * ) Notice: Subject to any disclaimer, the term of this patent is extended or adjusted under 35 U.S.C. 154(b) by 88 days.

(21) Appl. No.: 10/942,338

(22) Filed: Sep. 16, 2004

(65) Prior Publication Data

US 2005/0039475 A1 Feb. 24, 2005

Related U.S. Application Data

(62) Division of application No. 10/606,874, filed on Jun. 26, 2003.
(60) Provisional application No. 60/451,143, filed on Feb. 28, 2003.

(51) Int. Cl.[7] ............................................. F25B 45/00
(52) U.S. Cl. ............................... 62/77; 62/125; 62/149; 62/244
(58) Field of Search ........................... 62/77, 149, 244; 137/78.5, 115.01

(56) References Cited

U.S. PATENT DOCUMENTS

| | | | | |
|---|---|---|---|---|
| 4,711,096 A | * | 12/1987 | Krantz | ........................ 62/129 |
| 5,241,833 A | * | 9/1993 | Ohkoshi | ...................... 62/126 |
| 5,934,087 A | * | 8/1999 | Watanabe et al. | .............. 62/126 |
| 5,946,939 A | * | 9/1999 | Matsushima et al. | .......... 62/507 |
| 5,983,657 A | * | 11/1999 | Murata et al. | .............. 62/228.3 |
| 6,085,531 A | * | 7/2000 | Numoto et al. | ................ 62/149 |
| 6,197,211 B1 | * | 3/2001 | Nakajima et al. | .............. 252/68 |
| 6,260,365 B1 | * | 7/2001 | Davis et al. | ................... 62/154 |
| 6,374,492 B1 | * | 4/2002 | Myung et al. | ............ 29/890.03 |
| 6,536,225 B1 | * | 3/2003 | Yajima | ......................... 62/407 |
| 6,547,253 B2 | * | 4/2003 | Izumi et al. | ................. 277/594 |
| 6,635,053 B1 | * | 10/2003 | Lalonde et al. | ................ 606/22 |
| 6,644,098 B2 | * | 11/2003 | Cardinale et al. | ........... 73/25.01 |

FOREIGN PATENT DOCUMENTS

| | | | | |
|---|---|---|---|---|
| JP | 02000171130 A | * | 6/2000 | |
| JP | 02001093039 A | * | 4/2001 | |
| JP | 02001134827 A | * | 5/2001 | |
| JP | 02001208392 A | * | 8/2001 | |

* cited by examiner

Primary Examiner—William E. Tapolcai
Assistant Examiner—Mohammad M. Ali

(57) ABSTRACT

Each blow-off valve includes a valve body with a first movable wall defining a portion of the liquid fluid passage therein and a second movable wall defining a portion of the suction fluid passage therein. An actuator interconnects the movable walls for simultaneously moving the walls and opening the fluid passages in response to the electrical leakage-warning signal. In the species of FIGS. 2 and 3, the movable walls are integrally united with the valve body and include frangible sections that are fractured by an explosive squib to separate the movable walls from the body to simultaneously open the liquid and suction fluid passages. In the species of FIG. 5, the movable walls are separate valve elements disposed in a circular bore that opens the passages to the ambient surroundings. The actuator includes a spring, for biasing each of the valve elements out of its respective bore, and a holding device that weakens in response to the electrical leakage-warning signal.

3 Claims, 2 Drawing Sheets

HVAC SYSTEM WITH REFRIGERANT VENTING

RELATED APPLICATION

This application is a division of patent application Ser. No. 10/606,874, filed Jun. 23, 2003. This application claims the priority of provisional application having the Ser. No. 60/451,143 and filed on Feb. 28, 2003.

FIELD OF THE INVENTION

The subject invention relates to an air conditioning system for a vehicle, frequently referred to as a heating, ventilating and air conditioning (HVAC) system.

BACKGROUND OF THE INVENTION

Such systems typically include a compressor for compressing a refrigerant, a condenser for condensing the refrigerant, an evaporator for evaporating the refrigerant, a discharge fluid line interconnecting the compressor and the condenser, a liquid fluid line interconnecting the evaporator and the condenser, a suction fluid line interconnecting the evaporator and the compressor, and a refrigerant leakage warning device for providing a refrigerant leakage warning signal. The refrigerant leakage warning device may comprise a sensor in the passenger compartment of the vehicle or inside the HVAC module downstream of the evaporator for sensing the presence of the refrigerant, e.g., an infrared gas sensor, or it may comprise a crash sensor, e.g., the sensor used to initiate the deployment of air bags.

Various refrigerant venting systems are known in the prior art and examples of same are disclosed in U.S. Pat. Nos. 5,918,475 and 5,660,051 to Sakakibara et al., U.S. Pat. No. 5,983,657 to Murata et al. and U.S. Pat. No. 6,370,898 to Yamaguchi et al. however, there remains a need to effectively vent both the high and low (input and output) fluid lines connected to the evaporator.

SUMMARY OF THE INVENTION AND ADVANTAGES

The subject invention provides a method of venting refrigerant from an air conditioning system for a vehicle by simultaneously venting the liquid fluid line interconnecting the evaporator and condenser the and suction fluid line interconnecting the evaporator and the compressor in response to a refrigerant leakage warning signal. This method may be implemented by a blow off valve with a liquid fluid passage and a suction fluid passage, and an actuator for simultaneously venting said liquid and suction fluid passages in response to the refrigerant leakage warning signal.

Accordingly, the invention safely discharges refrigerant from the vehicle in the event of a leak into the passenger cabin space to minimize the amount of refrigerant entering the cabin. It does not interfere with the cooling performance or energy efficiency of the system. It is only activated when needed. It does not increase refrigerant-side repair costs. It could be added on in the after-market module to allow retrofit of vehicles by adding the blow off valve with the associated wiring. The intentional release of a refrigerant to the outside of the passenger and engine compartments can provide a quick and safe method of removing refrigerant from the vehicle that has an evaporator leak.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
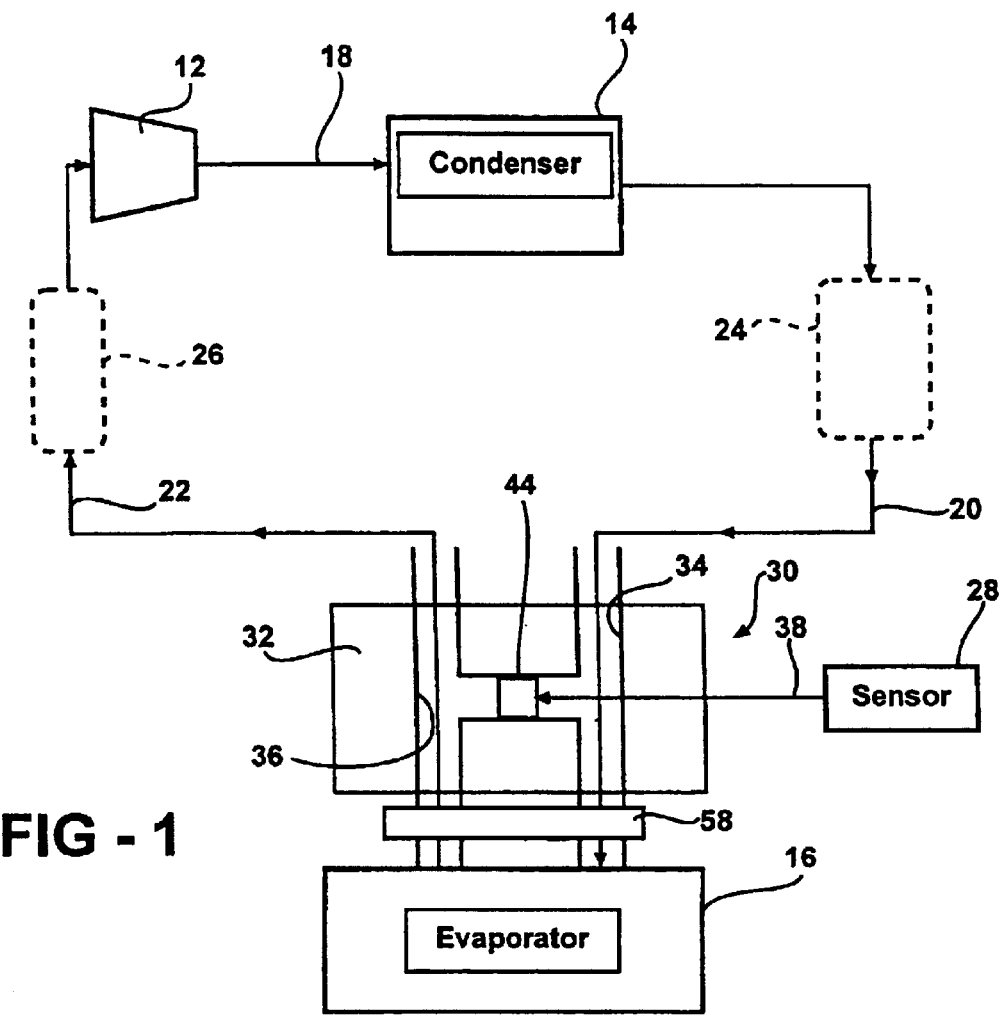
FIG. 1 is a schematic view of the invention employed in HVAC system having an expansion valve.

An air conditioning system for a vehicle is shown schematically in FIG. 1 and typically comprises a compressor 12 for compressing a refrigerant, a condenser 14 for condensing the refrigerant, and an evaporator 16 for evaporating the refrigerant.

A discharge fluid line 18 interconnects the compressor 12 and the condenser 14 and a liquid fluid line 20 interconnects the condenser 14 and the evaporator 16, while a suction fluid line 22 interconnects the evaporator 16 and the compressor 12. In some systems a receiver/drier 24 may be disposed in the liquid fluid line 20 and/or an accumulator/dehydrator 26 may be disposed in the suction fluid line 22 (as well known in the art).

A refrigerant leakage-warning device 28 provides a refrigerant leakage-warning signal. The leakage-warning device 28 may comprise one or more sensors to detect the presence of a refrigerant. The system configuration could use a sensor in the HVAC airflow passages as a leakage-warning device 28, the output of which would be set at a threshold of refrigerant concentration low enough to detect a real leak but high enough to prevent erroneous responses to ambient environmental gases. The sensor 28 could be located downstream of the evaporator 16. Once a leak is detected, the sensor output would be an electrical signal to energize a blow-off valve 30 for discharging the refrigerant to the outside of the vehicle. The refrigerant flow would be directed to exit the vehicle outside of both the passenger and engine compartments and into the environment at large. In some cases, it may be released into the engine compartment. The sensor 28 could be one of infrared capability for gas specificity. The threshold could be at refrigerant concentration defined, for example, 10,000 parts per million of the refrigerant. Instead of a gas sensor, the leakage-warning device 28 may be the sensor for deployment of the air bags in the cabin of the vehicle. In this case, a crash would cause an electrical signal to energize a blow-off valve 30 for discharging the refrigerant to the outside of the vehicle.

Figure 5:
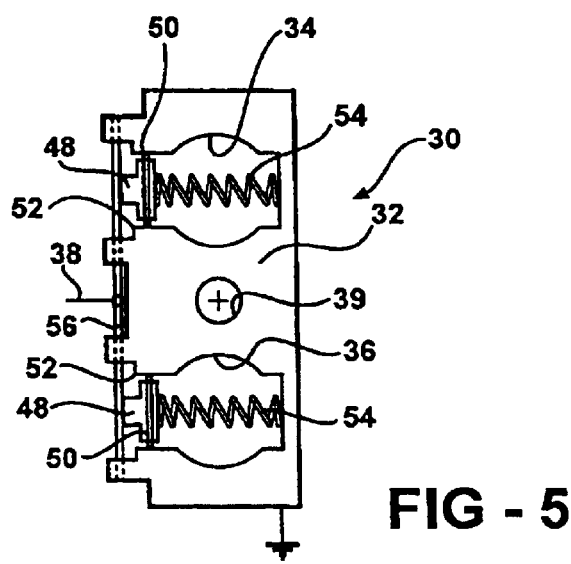
FIG. 5 is a plan view of a second embodiment of a valve body constructed in accordance with the teachings of the subject invention.
Figure 2:
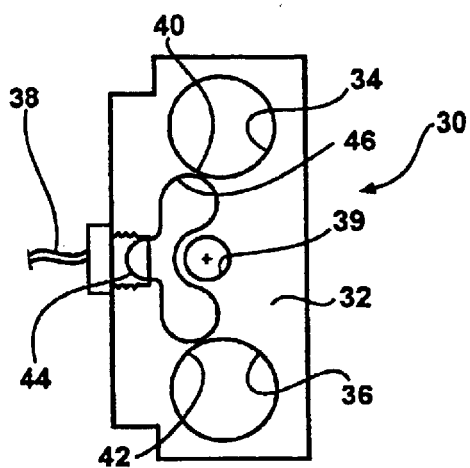
FIG. 2 is a plan view of a first embodiment of a valve body constructed in accordance with the teachings of the subject.
Figure 3:
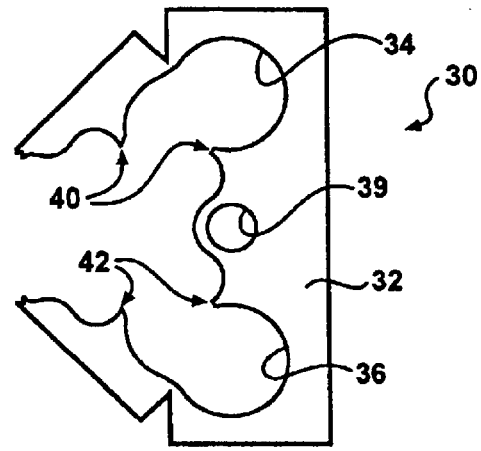
FIG. 3 is a view similar to FIG. 2 but showing the valve body in the venting condition.

The blow-off valves 30 of FIGS. 2 and 3 and of FIG. 5 respectively vent the liquid 20 and suction 22 fluid lines simultaneously in response to the refrigerant leakage-warning signal, the simultaneous being within seconds of one another. Each blow-off valve 30 includes a valve body 32 with a liquid fluid passage 34 and/or a suction fluid passage 36 and an actuator for simultaneously venting the liquid 20 and suction 22 fluid lines in response to the refrigerant leakage-warning signal. The actuator is electrically connected to the leakage-warning device 28 via an electrical lead 38 for receiving an electrical refrigerant leakage-warning signal from the refrigerant leakage-warning device.

In a generic sense, the valve body 32 includes a first movable wall defining a portion of the liquid fluid passage 34 therein and/or a second movable wall defining a portion of the suction fluid passage 36 therein. The actuator interconnects the movable walls for simultaneously moving the walls and opening the fluid passages 34 and 36 in response to the electrical leakage-warning signal. The valve body 32 includes a fastener hole 39 for mounting the valve body 32, e.g., mounting the valve body 32 on the evaporator 16.

In the species of FIGS. 2 and 3, the movable walls 40 and 42 are integrally united with the valve body 32 and include frangible sections. The actuator includes a squib 44 for providing an explosive force for fracturing and separating the movable walls 40 and 42 from the body 32 to simultaneously open the liquid 34 and suction 36 fluid passages in response to the electrical leakage-warning signal. The valve body 32 includes a squib cavity 46 adjacent to the fluid passages 34 and 36 and the squib 44 is disposed in the squib cavity 46 and the frangible sections are disposed between the squib cavity 46 and the respective fluid passages 34 and 36. The squib 44 creates an explosive force within the squib cavity 46 sufficient to fracture the frangible sections of the movable walls 40 and 42 as illustrated in FIG. 3. The valve body 32 could be located at the evaporator 16 and has an internal bypass between the liquid (high) 34 and the suction (low) 36 side. The squib 44 is located in this bypass and is activated by the electrical leakage-warning signal. The squib 44 explodes opening up the bypass as well as the opening to the outside. This allows the complete discharge of the refrigerant from the system. At service, the block valve body 32 would be replaced and the system recharged.

The design of FIGS. 2 and 3 is constructed such that it has a cavity 46 that has the squib 44 and the associated wiring mounted in a cavity so that in operation it is not exposed to the refrigerant. When it is detonated the walls 40, 42 of the valve body 32 open (FIG. 3) because of the detonation. This allows the high 34 to low 36 side to communicate with each other as well as open to the outside. Of note is the fact that this may be an extruded block that can be cheaply manufactured. The ends of the cavity 46 for the squib 44 are blocked off by the blocks on either side of the blowoff valve 30. In the case of the TXV system of FIG. 1, it would be the TXV 58 itself on the one side and the mating block fitting with the associated piping on the other side. In the case of an orifice tube 60 system of FIG. 4 (not shown in FIG. 5 or anywhere else. A block could be added in FIG. 1 where the TXV 58 is located—show a block the size of the TXV 58 that is adjacent to it and is at the inlet and exit to the evaporator—in fact, that block is usually present for both systems and in the case of the TXV system, the TXV mates to that block. For an orifice tube system the orifice tube system the orifice is generally located away from the evaporator in the liquid line 20 but could be in the position shown in FIG. 4), it would be the block fittings that are normally used in this system on both sides, the orifice tube 60 could be any where in the line 20.

In the species of FIG. 5, the movable walls are separate valve elements 48 in sealing engagement via O-rings 50 with the respective fluid passages 34 and 36. In other words, each of the valve elements 48 is disposed in a circular bore 52 that opens the passages 34 and 36 to the ambient surroundings. The actuator includes a biasing device 54, e.g., a spring, for biasing each of the valve elements 48 out of the sealing engagement in its respective bore 52, and a holding device 56 for holding the separate valve elements 48 in the sealing engagement and for allowing the separate valve elements 48 to be moved out of the sealing engagement by the biasing device 54 in response to the electrical leakage-warning signal via lead 38. The holding device 56 comprises a material that weakens in response to the electrical leakage-warning signal, i.e., in response to electrical current, the valve body 32 being grounded. Under normal conditions there is no electrical power delivered to the block fitting but upon sensing a refrigerant leak or vehicle impact electrical power is delivered via a lead 38 to the blow-off valve 30. This electrical power weakens the mechanical properties of the retainer or actuator 56. At such point that the mechanical properties of the actuator 56 become weaker than the force of the springs 54, the springs 54 release the retaining valve elements 48 and the refrigerant has a free path to the environment from both the high and low sides of the air conditioning loop.

Releasing the refrigerant outside of the vehicle cabin prevents the accumulation of refrigerant in the cabin where it could potentially pose problems. Also, venting from both sides of the air conditioning loop prevents the refrigerant from having to pass through the evaporator 16 in the cabin to vent.

Accordingly, the invention provides a blow-off valve 30 for an air conditioning system for a vehicle comprising a valve body 32 with a liquid fluid passage 34 and a suction fluid passage 36, and an actuator 44 or 56 for simultaneously venting the liquid 34 and suction 36 fluid passages in response to the refrigerant leakage-warning signal. The actuator 44 or 56 includes an electrical connection 38 for being electrically connected to the leakage-warning device 28 for receiving an electrical refrigerant leakage-warning signal. The valve body 32 includes a first movable wall 40 or 48 defining a portion of the liquid fluid passage 34 therein and a second movable wall 42 or 48 defining a portion of the suction fluid passage 36 therein. The actuator 44 or 56 interconnecting the movable walls 40, 42 or 48 for simultaneously moving the walls and opening the fluid passages 34 and 36 in response to the electrical leakage-warning signal 38.

The key to this invention is that the system is discharged from both the liquid 34 (high) and suction 36 (low) sides simultaneously. Also, the evaporator 16 is isolated during the discharge, thus, preventing the refrigerant from the rest of the system to empty out without going through the evaporator 16. Also, simultaneously, the entire refrigerant mass resident in the evaporator 16 finds a quick way to exit from the evaporator 16. In fact, if a leak is opened up in the evaporator 16, most of the refrigerant will not have to pass the leak site in emptying out the evaporator 16 because both the inlet or liquid side 34 and the outlet or suction side 36 to the evaporator 16 are exposed to the outside environment. The path to the outside environment can either be directly from the blow-off valve 30 into the engine compartment or it could be ported through a flexible hose into a safer area such as the wheel well or even towards the middle of the vehicle under the floor pan or any other location deemed to be better for venting.

Figure 4:
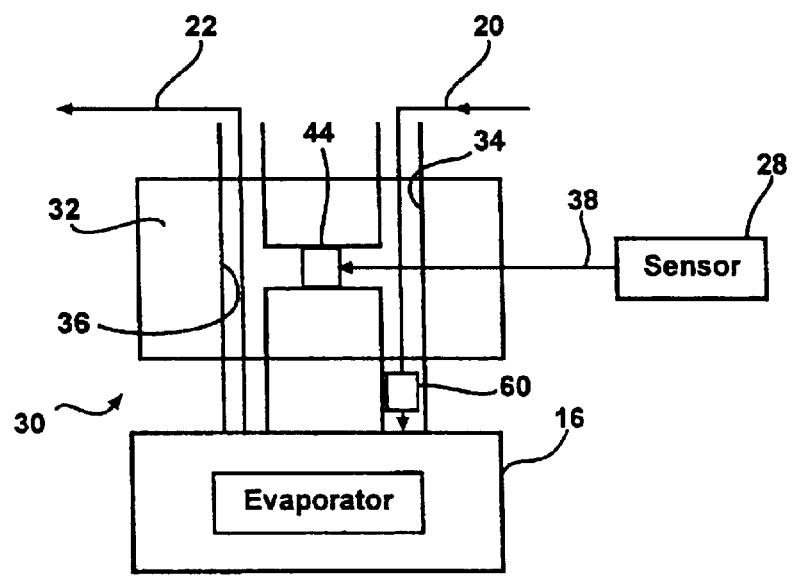
FIG. 4 is a schematic view of the invention employed in HVAC system having an orifice tube.

FIG. 1 is the system configuration for the thermal expansion valve (TXV) 58 system and FIG. 4 is the configuration for the orifice tube 60 system, both well known in the art. In the system with the expansion valve 58, the release line is located downstream of the receiver/drier 24 but before the TXV 58. In this case, the compressor 12 will be turned off immediately. The release outlet would allow for quick venting. Of course, simultaneously, an instrument panel warning light will also go on to indicate that a leak has been detected and the owner should take the vehicle in for servicing. In the system with the orifice tube 60, the release line is located downstream of the orifice tube 60 if it is located remotely (for example at the condenser outlet of the liquid line 20. If the orifice tube 60 is located in the evaporator 16 inlet pipe of liquid line 20 then the blowoff valve 30 will be located between the condenser outlet and the orifice tube 60 as close to the orifice tube 60 as possible. Again, the compressor 12 will be turned off immediately to allow for quick venting. Again, an Instrument panel warning light will also go on to indicate that a leak has been detected and the owner should take the vehicle in for servicing.

As alluded to above, the invention includes a method of venting refrigerant in an air conditioning system for a vehicle comprising the step of simultaneously venting the liquid 20 and suction 22 fluid lines in response to the refrigerant leakage-warning signal. The method is further defined as providing liquid 34 and suction 36 passages in a common valve body 32 for fluid communication with the liquid 20 and suction 22 fluid lines, providing a first movable wall 40 or 48 defining a portion of the liquid fluid passage 34 in the valve body 32, providing a second movable wall 42 or 48 defining a portion of the suction fluid passage 36 in the valve body 32, and simultaneously moving the walls 40, 42 or 48 and opening the fluid passages 34 and 36 by a common actuator 44 or 56. This is accomplished by sending an electrical leakage-warning signal 38 to the actuator 44 or 56.

Obviously, many modifications and variations of the present invention are possible in light of the above teachings. The invention may be practiced otherwise than as specifically described within the scope of the appended claims.

What is claimed is:

1. A method of venting refrigerant in an air conditioning system for a vehicle having a compressor for compressing a refrigerant, a condenser for condensing the refrigerant, an evaporator for evaporating the refrigerant, a discharge fluid line interconnecting the compressor and the condenser, a liquid fluid line interconnecting the condenser and the evaporator, a suction fluid line interconnecting the evaporator and the compressor, and a refrigerant leakage-warning device for providing a refrigerant leakage-warning signal, said method comprising the step of;

simultaneously venting said liquid and suction fluid lines in response to the refrigerant leakage-warning signal.

2. A method as set forth in claim 1 further defined as providing liquid and suction passages in a common valve body for fluid communication with the liquid and suction fluid lines, providing a first movable wall or defining a portion of the liquid fluid passage in the valve body, providing a second movable wall defining a portion of the suction fluid passage in the valve body, and simultaneously moving the walls and opening the fluid passages by a common actuator.

3. A method as set forth in claim 2 further defined as sending an leakage-warning electrical signal to the actuator.

* * * * *